(12) United States Patent
Yoshida et al.

(10) Patent No.: US 8,741,504 B2
(45) Date of Patent: Jun. 3, 2014

(54) SOLID CATALYSTS AND FUEL CELL EMPLOYING THE SOLID CATALYSTS

(75) Inventors: Takashi Yoshida, Kashiwa (JP); Fumihiko Aiga, Yokohama (JP); Satoshi Itoh, Omitama (JP); Yoshiko Hiraoka, Kawasaki (JP); Reiko Yoshimura, Kawasaki (JP); Tsukasa Tada, Hachioji (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1048 days.

(21) Appl. No.: 12/323,244

(22) Filed: Nov. 25, 2008

(65) Prior Publication Data

US 2009/0136826 A1    May 28, 2009

(30) Foreign Application Priority Data

Nov. 26, 2007   (JP) ................ P2007-304573

(51) Int. Cl.
| | |
|---|---|
| H01M 4/02 | (2006.01) |
| H01M 4/36 | (2006.01) |
| H01M 4/92 | (2006.01) |
| H01M 8/00 | (2006.01) |
| B32B 15/01 | (2006.01) |
| B32B 15/02 | (2006.01) |
| B01J 23/16 | (2006.01) |
| B01J 23/40 | (2006.01) |
| B01J 23/42 | (2006.01) |
| B01J 23/46 | (2006.01) |
| B01J 23/64 | (2006.01) |
| B01J 23/20 | (2006.01) |
| B01J 23/00 | (2006.01) |

(52) U.S. Cl.
USPC .......... 429/524; 428/544; 428/615; 429/400; 429/523; 429/526; 502/300; 502/308; 502/313; 502/325; 502/326

(58) Field of Classification Search
USPC .............. 429/40, 44, 13, 400, 523, 524, 526; 502/300, 313, 325, 326, 308; 428/544, 428/615
See application file for complete search history.

(56) References Cited

U.S. PATENT DOCUMENTS

| | | | | | |
|---|---|---|---|---|---|
| 3,506,494 | A | * | 4/1970 | Adlhart | 429/442 |
| 5,879,827 | A | * | 3/1999 | Debe et al. | 429/524 |
| 2005/0014635 | A1 | * | 1/2005 | Zhou et al. | 502/159 |

FOREIGN PATENT DOCUMENTS

| | | |
|---|---|---|
| JP | 10-228912 | 8/1998 |
| JP | 2001-519594 | 10/2001 |

(Continued)

OTHER PUBLICATIONS

Hubert A. Gasteiger et al., "CO Electrooxidation on Well-Characterized Pt-Ru Alloys," The Journal of Physical Chemistry, 98:2, 1994, pp. 617-625.
S. Wasmus et al., "Methanol Oxidation and Direct Methanol Fuel Cells: A Selective Review," Journal of Electroanalytical Chemistry 461, 1999, pp. 14-31.

Primary Examiner — Patrick Ryan
Assistant Examiner — Aaron Greso
(74) Attorney, Agent, or Firm — Finnegan, Henderson, Farabow, Garrett & Dunner, L.L.P.

(57) ABSTRACT

A solid catalyst having a close-packed structure has basic structural units present in the surface of the solid catalyst, the basic structural units including (i) a triangular lattice constituted of atoms of platinum, ruthenium, and at least one additional element which are disposed at the vertexes in the triangular lattice so that each atom of one of the elements adjoins atoms of the other elements or (ii) a rhombic lattice constituted of atoms of platinum, ruthenium, and at least one additional element which are disposed at the vertexes in the rhombic lattice in an atomic ratio of 1:2:1 so that each ruthenium atom directly adjoins a platinum atom and an atom of the additional element; and a fuel cell includes either of the solid catalyst as an anode-side electrode catalyst.

8 Claims, 4 Drawing Sheets

(56) References Cited

FOREIGN PATENT DOCUMENTS

| JP | 2002-134122 | 5/2002 |
|----|-------------|--------|
| JP | 2003-157857 | 5/2003 |
| JP | 2006-045614 | 2/2006 |
| JP | 2006-190686 | 7/2006 |
| JP | 2007-035489 | 2/2007 |
| JP | 2007-220654 | 8/2007 |

* cited by examiner

SOLID CATALYSTS AND FUEL CELL EMPLOYING THE SOLID CATALYSTS

CROSS-REFERENCE TO RELATED APPLICATIONS

This application is based upon and claims the benefit of priority from the prior Japanese Patent Application No. 2007-304573, filed on Nov. 26, 2007, the entire contents of which are incorporated herein by reference.

BACKGROUND OF THE INVENTION

1. Field

The present invention relates to solid catalysts and a fuel cell.

2. Description of the Related Art

Solid polymer type fuel cells, which are characterized by having a high current density, are known as one kind of fuel cells. Of these, direct-methanol fuel cells (DMFCs), which are preferable for size reduction, are being developed enthusiastically.

The reactions occurring on the anode side in a direct-methanol fuel cell (DMFC) are methanol decomposition reactions which proceed in steps on the surface of the metal catalyst. Namely, an anode reaction represented by the following scheme 1 proceeds on the anode side.

$$CH_3OH + H_2O \rightarrow 6H^+ + 6e^- + CO_2 \quad \text{(scheme 1)}$$

The carbon dioxide generation reaction which is the final step in this anode reaction is one of the reaction-rate-determining steps. The fact that this step is a rate-determining step is generally known to be attributable to "carbon monoxide poisoning" in which the carbon monoxide generated by the proton elimination reaction of the methanol as a fuel is tightly adsorbed onto the platinum surface to thereby reduce the catalytic activity.

In this connection, it is known that the value of active current is greatly improved by replacing the platinum catalyst with a platinum-ruthenium alloy catalyst. This improvement is thought to be attained by the following mechanism. The carbon monoxide generated on the platinum surface is rapidly oxidized by the ruthenium, which has the higher ability to oxidize carbon monoxide than platinum. Because of this, the carbon monoxide poisoning of the platinum surface, which is important for the methanol decomposition reaction, is reduced (see H. A. Gasteiger, N. Markovic, P. N. Ross, E. J. Cairns, *J. Phys. Chem.*, 98, 617 (1994) and S. Wasmus and A. Kuver, *J. Electroanal. Chem.*, 461, 14 (1999)).

Many attempts have been made to improve catalytic activity and heighten the value of active current by reducing the carbon monoxide poisoning of platinum in a higher degree than in the case of using a platinum-ruthenium alloy catalyst.

One of approaches to the poisoning reduction is a "multinary alloy catalyst" obtained by adding one or more other elements to a platinum-ruthenium alloy. However, since there is no clear guideline for design in catalyst composition screening, the method in general use is to experimentally investigate each of many catalyst compositions.

On the other hand, besides composition, it is important to regulate a surface structure so as to have high activity in a desired reaction. However, there are few patent documents concerning a technique for positively controlling the surface structure of an electrode catalyst.

JP-A 2003-157857 (KOKAI) proposes a fuel cell cathode (air electrode) which has a catalyst surface including a large proportion of exposed platinum (001) faces, which have higher activity, to thereby have improved activity. JP-A 2007-220654 (KOKAI) proposes an anode which has a catalyst-alloy surface including exposed (100) faces, (010) faces, and (001) faces to thereby have improved catalytic activity as in the technique described above.

However, in the case of the platinum-ruthenium alloy catalyst containing one or more additional elements, the correlation between the state of distribution of the atoms in the catalyst surface and catalytic activity is not clear.

As described above, the conventional solid catalysts for use in direct-methanol fuel cells (DMFCs) have had a problem concerning carbon monoxide poisoning.

BRIEF SUMMARY OF THE INVENTION

The invention may provide, according to a first aspect thereof, a solid catalyst having a close-packed structure, which has basic structural units present in the surface of the solid catalyst, the basic structural units including a triangular lattice constituted of atoms of platinum, ruthenium, and at least one additional element which are disposed at the vertexes in the triangular lattice so that each atom of one of the elements adjoins atoms of the other elements.

The invention may provide, according to a second aspect thereof, a solid catalyst having a close-packed structure, which has basic structural units present in the surface of the solid catalyst, the basic structural units including a rhombic lattice constituted of atoms of platinum, ruthenium, and at least one additional element which are disposed at the vertexes in the rhombic lattice in an atomic ratio of 1:2:1 so that each ruthenium atom directly adjoins a platinum atom and an atom of the additional element.

The invention further may provide a fuel cell which includes the solid catalyst according to the first or second aspect of the invention as an anode-side electrode catalyst.

According to the embodiments of the invention, solid catalysts having an excellent function which diminishes carbon monoxide poisoning and a fuel cell employing either of the solid catalysts are provided.

DETAILED DESCRIPTION OF THE INVENTION

Figure 1A:
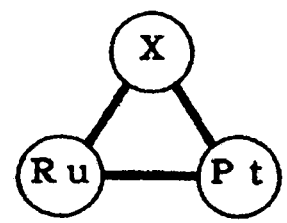
FIG. 1A is a diagrammatic view of a first embodiment of the invention.

Embodiments of the invention will be explained below by reference to the drawings. In the drawings, identical or like parts are designated by identical or like signs. It should, however, be noted that the drawings are diagrammatic and that the relationship between thickness and planar dimension, the proportion among the thicknesses of layers, etc. differ from actual ones. Consequently, specific thicknesses and dimensions must be judged in consideration of the following explanations. It is a matter of course that the drawings may include respective parts which differ from each other in dimensional relationship or proportion.

The embodiments shown below are intended to show apparatus and methods, as examples, for materializing technical ideas of the embodiments of the invention. The technical ideas of the embodiments should not be construed as limiting the material, shape, structure, arrangement, etc. of each constituent element to the following ones. The technical ideas of the embodiments can be variously modified within the scope of the claims.

First Embodiment

A first embodiment of the invention is explained below by reference to drawings. In the following explanation, a direct-methanol fuel cell (DMFC) employing an aqueous methanol solution as a fuel is explained as an example.

FIG. 1A is a diagrammatic view showing a basic structural unit of a solid catalyst according to the first embodiment. The solid catalyst according to this embodiment of the invention is a solid catalyst having a close-packed structure, and is characterized by having basic structural units present in the surface of the solid catalyst, the basic structural units including a triangular lattice constituted of atoms of platinum, ruthenium, and at least one additional element which are disposed at the vertexes in the triangular lattice so that each atom of one of the elements adjoins atoms of the other elements.

Figure 2A:
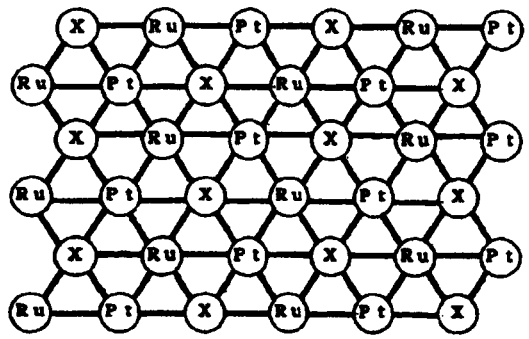
FIG. 2A is a diagrammatic view of an example of a first embodiment of the invention.

FIG. 2A is a diagrammatic view illustrating a first modification which is a solid catalyst according to the first embodiment in which the basic structural unit of the catalyst is repeatedly spread in the catalyst surface. Namely, the basic structural units present in the surface of the solid catalyst include a triangular lattice constituted of atoms of platinum, ruthenium, and at least one additional element which are disposed at the vertexes in the triangular lattice so that each atom of one of the elements adjoins atoms of the other elements and are disposed in a close-packed arrangement in the surface of the catalyst.

Figure 2B:
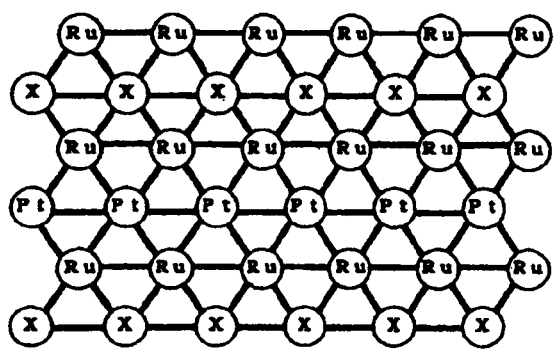
FIG. 2B is a diagrammatic view of an example of a second embodiment of the invention.
Figure 2C:
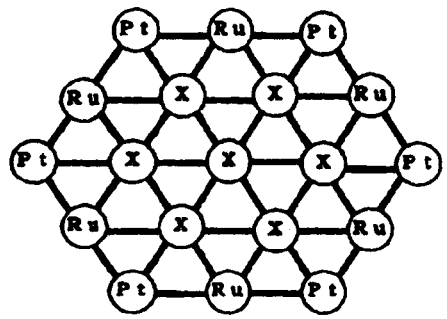
FIG. 2C is a diagrammatic view of another example of the first embodiment of the invention.

FIG. 2C is a diagrammatic view illustrating a second modification which is a solid catalyst according to the first embodiment in which the basic structural unit of the catalyst is repeatedly spread in the catalyst surface. Namely, the basic structural units present in the surface of the solid catalyst include a triangular lattice constituted of atoms of platinum, ruthenium, and at least one additional element which are disposed at the vertexes in the triangular lattice so that each atom of one of the elements adjoins atoms of the other elements and are disposed circularly in the surface of the catalyst.

Second Embodiment

A second embodiment of the invention is explained below by reference to drawings. Incidentally, explanations on parts which are the same as in the first embodiment are omitted.

Figure 1B:
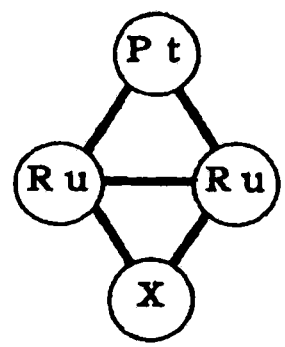
FIG. 1B is a diagrammatic view of a second embodiment of the invention.

FIG. 1B is a diagrammatic view showing a basic structural unit of a solid catalyst according to the second embodiment. The solid catalyst according to this embodiment is a solid catalyst having a close-packed structure, which has basic structural units present in the surface of the catalyst, the basic structural units including a rhombic lattice constituted of atoms of platinum, ruthenium, and at least one additional element which are disposed at the vertexes in the rhombic lattice in an atomic ratio of 1:2:1 so that each ruthenium atom directly adjoins a platinum atom and an atom of the additional element.

FIG. 2B is a diagrammatic view illustrating a first modification which is a solid catalyst according to the second embodiment in which the basic structural unit of the catalyst is repeatedly spread in the catalyst surface. Namely, the basic structural units present in the surface of the solid catalyst and including a rhombic lattice constituted of atoms of platinum, ruthenium, and at least one additional element which are disposed at the vertexes in the rhombic lattice in an atomic ratio of 1:2:1 are disposed in a close-packed arrangement in the surface of the catalyst so that none of the vertexes and sides of each basic structural unit is shared.

Figure 2D:
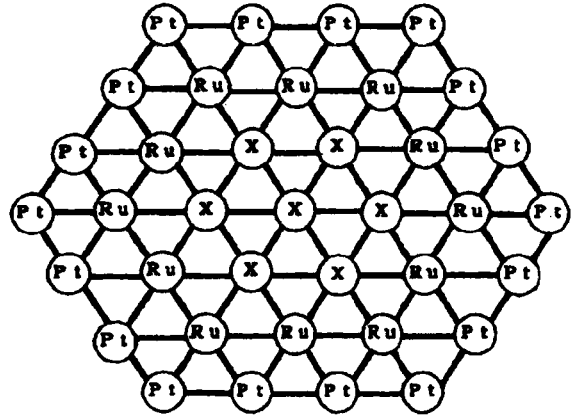
FIG. 2D is a diagrammatic view of another example of the second embodiment of the invention.

FIG. 2D is a diagrammatic view illustrating a second modification which is a solid catalyst according to the second embodiment in which the basic structural unit of the catalyst is repeatedly spread in the catalyst surface. Namely, the basic structural units present in the surface of the solid catalyst and including a rhombic lattice constituted of atoms of platinum, ruthenium, and at least one additional element which are disposed at the vertexes in the rhombic lattice in an atomic ratio of 1:2:1 are disposed circularly in the surface of the catalyst so that none of the vertexes and sides of each basic structural unit is shared.

The solid catalysts shown in FIG. 2A and FIG. 2B can be produced by the following process. First, an element X, ruthenium, and platinum are deposited by layer-by-layer vapor deposition to produce a Pt/Ru/X multilayer structure. The layered structure obtained is cut in an oblique direction to thereby form a nanostructure composed of repetitions of Pt/Ru/X in a stripe arrangement in a desired surface. X is any one element selected from the group consisting of Nb, Zr, Hf, and Ta.

The solid catalysts shown in FIG. 2C and FIG. 2D can be produced by the following process. First, nanoparticles each having a core-shell structure composed of a core made of an element X (X=Nb, Zr, Hf, or Ta) and a shell surrounding the core and made of Pt and Ru in a ratio of 1:1 are produced by applying the technique for core-shell structure production described in *J. Phys. Chem.*, 109, 22701 (2005). Thereafter, the nanoparticles having a core-shell structure obtained are aggregated in a planar arrangement on a surface of platinum serving as a matrix phase. Furthermore, platinum as a matrix phase is vapor-deposited thereon so that the aggregated nanoparticles are completely buried. The resultant substrate containing the nanoparticles buried in a planar arrangement is subjected to sputtering to abrade the surface, whereby desired nanostructures in a circularly gathered state can be obtained.

The solid catalysts thus produced have the following technical meanings.

Ruthenium atoms and atoms of another element which further improves the affinity of ruthenium atoms for carbon monoxide molecules are disposed so that the atoms of that element are located near the ruthenium atoms. Thus, a further reduction in the carbon monoxide poisoning of the platinum surface can be attained.

A nanostructure is characterized by having a "Pt—Ru pair", i.e., the presence of a ruthenium atom at a lattice vertex which adjoins a platinum atom, and an "Ru—X pair", i.e., the presence of an IVB Group, VB Group, or VIB Group element (hereinafter referred to as element X) at a lattice vertex which adjoins the ruthenium atom, and further having a "Pt—X pair".

The domain size of the atoms of each of the platinum, ruthenium, and the additional element depends on the reactivity of methanol in dehydrogenation reaction, which is the preceding reaction in which carbon monoxide molecules are generated.

This reaction occurs mainly on the platinum. The amount of platinum, i.e., the size of platinum domains, is hence optimized so as to be preferable for the reaction. The domain size of the ruthenium and that of the element X are optimized while taking account of the fact that the affinity of ruthenium for carbon monoxide molecules is enhanced by the influence of element X and this is a requirement necessary for property impartation.

An ideal domain size is one which enables each ruthenium atom to adjoin an atom of the additional element X. A more ideal structure need have, in the basic structural units, the feature of any of the catalyst outermost-surface structures described above.

Incidentally, the nanoaggregate structures diagrammatically shown in FIG. 2A, FIG. 2B, FIG. 2C and FIG. 2D are idealized structures, and the structures according to the embodiments of the invention do not require those structures shown in FIG. 2A, FIG. 2B, FIG. 2C and FIG. 2D to spread semi-permanently. The embodiments of the invention may include solid catalysts in which any of the structures shown in FIG. 2A, FIG. 2B, FIG. 2C and FIG. 2D is distributed as a partial structure in the catalyst surface.

The following Examples demonstrate that "the reduction of carbon monoxide poisoning of platinum by increasing the energy of carbon monoxide adsorption onto ruthenium" is realized by the solid catalysts according to the embodiments of the invention.

Example 1

An analysis was made of changes in the energy of adsorption of carbon monoxide molecules onto a surface of a ruthenium (Ru) slab in the case where ruthenium atoms present in the surface of the ruthenium (Ru) slab were replaced with atoms of each of zirconium (Zr), niobium (Nb), molybdenum (Mo), technetium (Tc), rhodium (Rh), and palladium (Pd), which are transition metal elements in the fifth period.

Figure 3:
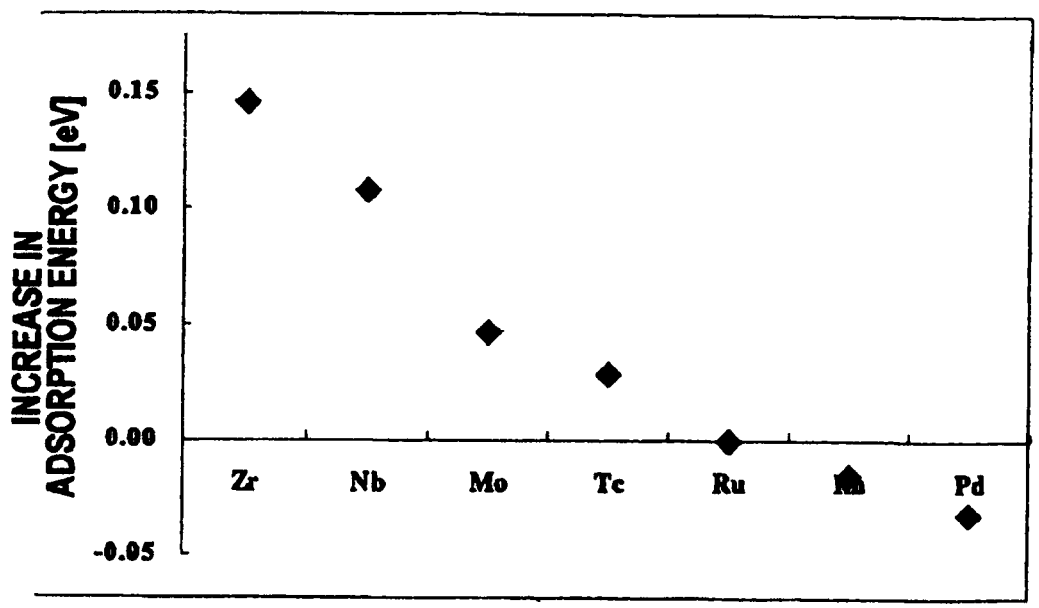
FIG. 3 is a first diagrammatic presentation showing an effect of an embodiment of the invention.

In this case, there is a tendency that the energy of carbon monoxide adsorption onto the ruthenium increases when the IVB Group, VB Group, or VIB Group element is present (FIG. 3).

Figure 4:
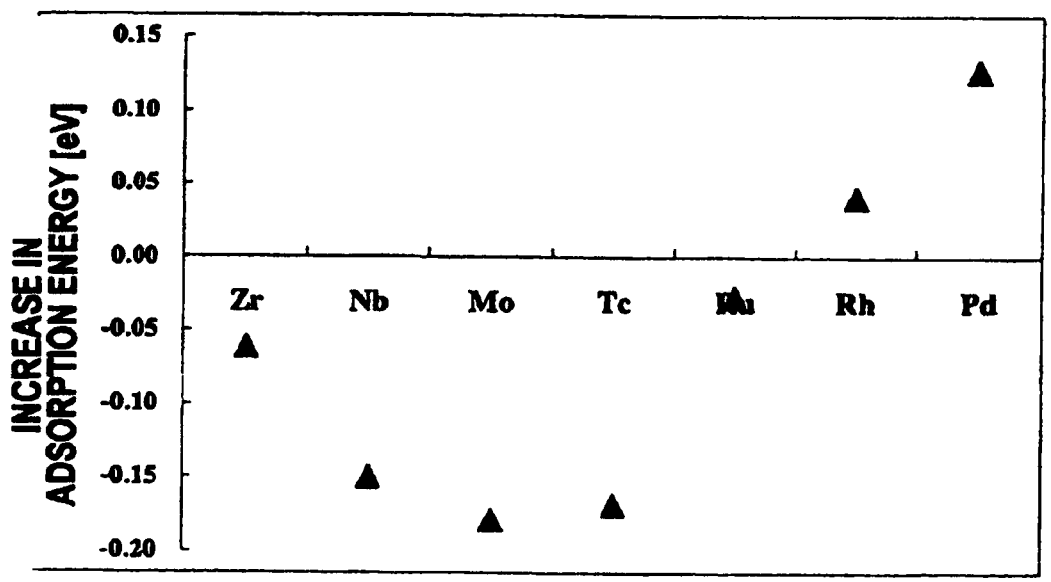
FIG. 4 is a second diagrammatic presentation showing an effect of an embodiment of the invention.

This indicates that the affinity of the ruthenium for carbon monoxide molecules has improved. On the other hand, in the case where platinum atoms in a platinum (Pt) slab surface were likewise replaced with atoms of each of the transition metal elements in the fifth period, the energy of carbon monoxide adsorption decreases when the IVB Group, VB Group, or VIB Group element is present (FIG. 4).

It can be seen from these analyses that platinum and ruthenium have opposite tendencies concerning the energy of carbon monoxide (CO) adsorption. The effects of the additional elements in the case of the ruthenium (Ru) slab and platinum (Pt) slab are thought to be as follows. The results indicate that the replacement of surface atoms with atoms of the IVB, VB, or VIB Group element enables carbon monoxide molecules to move from platinum atom sites to ruthenium atom sites more easily than in the case of no replacement. It was thus ascertained that there is a possibility that the carbon monoxide might be rapidly oxidized.

Example 2

An analysis was made of changes in the energy of adsorption of carbon monoxide molecules onto platinum atoms and ruthenium atoms in the case where a structure composed of minimum structural units according to the embodiment of the invention in which an additional element X for replacement had been incorporated in Pt:Ru=2:1 was formed in a platinum (Pt) slab surface.

Figure 5:
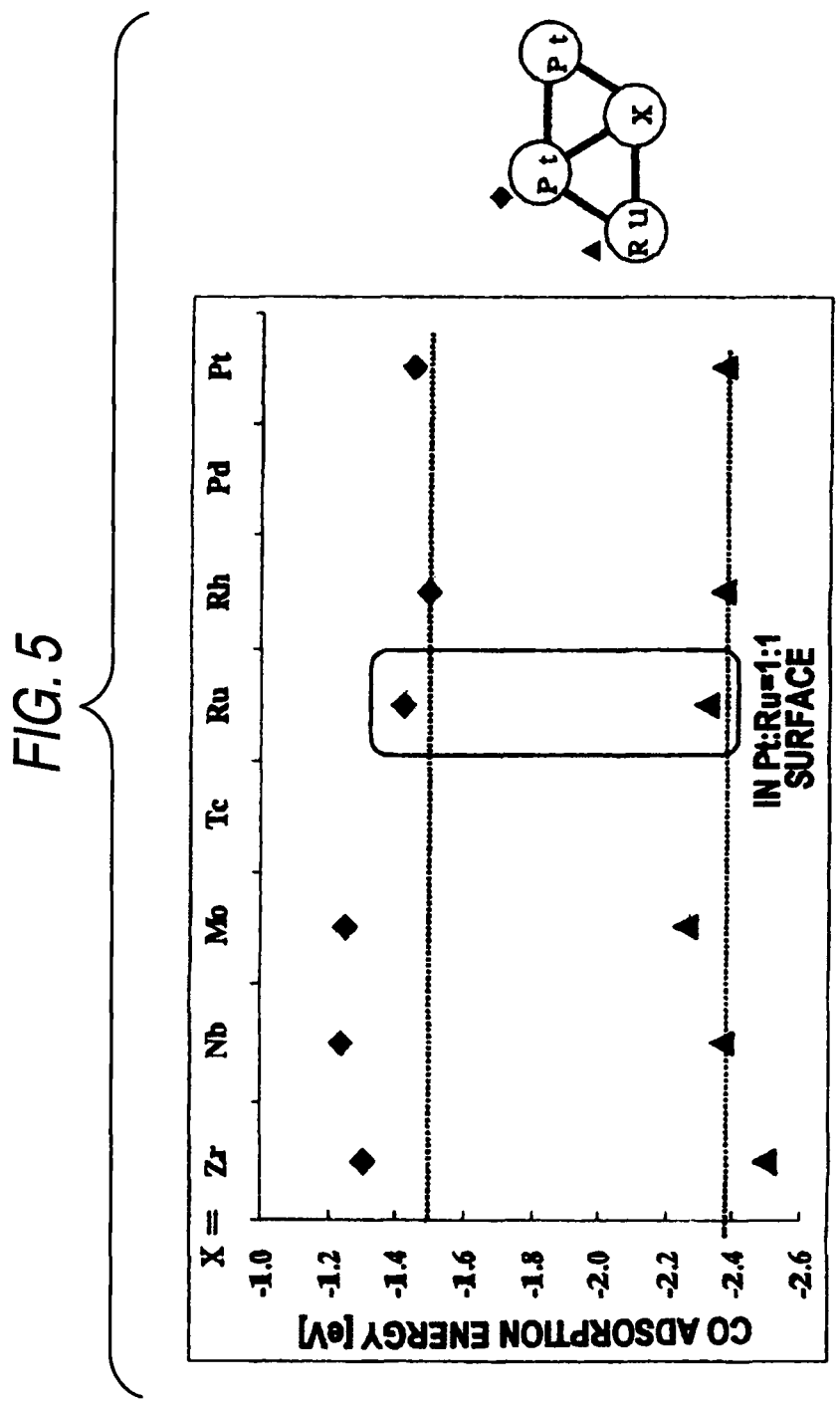
FIG. 5 is a third diagrammatic presentation showing an effect of an embodiment of the invention.

When the energy of carbon monoxide adsorption onto platinum atoms and that of carbon monoxide adsorption onto ruthenium atoms in a surface having a composition in which Pt:Ru=1:1 are taken as bases, then influences of replacement with elements are as follows. In the case of replacement with the VIB Group or VB Group element, the energy of carbon monoxide molecule adsorption onto the ruthenium improved, whereas the energy of carbon monoxide molecule adsorption onto the platinum decreased. This tendency is opposite to that observed above (FIG. 5).

Those results indicate that the replacement of surface atoms with atoms of the IVB Group element, VB Group element, or VIB Group element enables carbon monoxide molecules to move from platinum atom sites to ruthenium atom sites more easily than in the case of no replacement. It was thus ascertained that there is a possibility that the carbon monoxide might be rapidly oxidized.

[Fuel Cell]

A fuel cell employing either of the solid catalysts as an anode-side electrode catalyst can be provided. For producing this fuel cell, known processes can be used.

A specific example is shown briefly. The solid catalyst described above is mixed with and dispersed in a perfluorosulfonic acid resin solution (Nafion solution (trademark)), water, and ethylene glycol. Thereafter, the resultant dispersion is applied to an electrolyte membrane by spraying to thereby produce an anode-side electrode catalyst layer. As the electrolyte membrane may be used a Nafion membrane (trademark).

On the other hand, a cathode-side electrode catalyst layer is produced by mixing a platinum catalyst as a cathode catalyst with a perfluorosulfonic acid resin solution (Nafion solution (trademark)), water, and ethylene glycol to obtain a dispersion and applying the dispersion to the electrolyte membrane by spraying.

The electrolyte membrane coated on both sides respectively with the anode-side electrode catalyst layer and the cathode-side electrode catalyst layer is jointed with an anode gas diffusion layer and a cathode gas diffusion layer to produce a membrane electrode assembly. This membrane electrode assembly is held between an anode gas diffusion layer and a cathode gas diffusion layer. Furthermore, the resultant assembly is held between an anode passage plate and a cathode passage plate. Thus, one power generation unit is completed. Power generation units each produced in this manner are stacked, and an anode current collector and a cathode current collector are disposed on the respective ends to thereby complete a power generation part. This power generation part is provided with a fuel tank, fuel feed pump, air feeder, etc. as auxiliary devices. Thus, a fuel cell can be constituted. Specifically, the electrode assembly shown in the FIG. 2 in JP-A 2007-35489 (KOKAI) is formed and the fuel cell shown in the FIG. 1 therein can be constituted.

What is claimed is:

1. A solid catalyst having a close-packed structure, which has basic structural units present in the surface of the solid catalyst, the basic structural units comprising a platinum phase with an abraded surface, the platinum phase including an aggregation of nanoparticles having a core-shell structure, the shell surrounding the core and constituted of atoms of platinum or ruthenium and the core constituted of atoms of at least one additional element, the basic structural units arranged in a triangular lattice and disposed at vertexes in the triangular lattice so that each atom of one of the elements adjoins atoms of the other elements.

2. A solid catalyst having a close-packed structure, which has basic structural units present in the surface of the solid catalyst, the basic structural units comprising a platinum phase with an abraded surface, the platinum phase including an aggregation of nanoparticles having a core-shell structure, the shell surrounding the core and constituted of atoms of platinum or ruthenium and the core constituted of atoms of at least one additional element, the basic structural units arranged in a rhombic lattice and disposed at vertexes in the rhombic lattice in an atomic ratio of 1:2:1 so that each ruthenium atom directly adjoins a platinum atom and an atom of the additional element.

3. The solid catalyst of claim 2, wherein the basic structural units are disposed in a close-packed arrangement in the surface of the catalyst so that none of the vertexes and sides of each basic structural unit is shared.

4. The solid catalyst of claim 2, wherein the basic structural units are disposed circularly in the surface of the catalyst so that none of the vertexes and sides of each basic structural unit is shared.

5. The solid catalyst of claim 1, wherein the additional element comprises any one member selected from the group consisting of Nb, Zr, Hf, and Ta.

6. The solid catalyst of claim 2, wherein the additional element comprises any one member selected from the group consisting of Nb, Zr, Hf, and Ta.

7. A fuel cell which comprises, as an anode-side electrode catalyst, a solid catalyst having a close-packed structure, which has basic structural units present in the surface of the solid catalyst, the basic structural units comprising a platinum phase with an abraded surface, the platinum phase including an aggregation of nanoparticles having a core-shell structure, the shell surrounding the core and constituted of atoms of platinum or ruthenium and the core constituted of atoms of at least one additional element, the basic structural units arranged in a triangular lattice and disposed at vertexes in the triangular lattice so that each atom of one of the elements adjoins atoms of the other elements.

8. The fuel cell of claim 7, wherein the additional element comprises any one member selected from the group consisting of Nb, Zr, Hf, and Ta.

* * * * *